No. 896,104. PATENTED AUG. 18, 1908.
C. W. M. GUHLE.
GUARD OR FENDER FOR VEHICLES.
APPLICATION FILED JAN. 20, 1908.
2 SHEETS—SHEET 1.
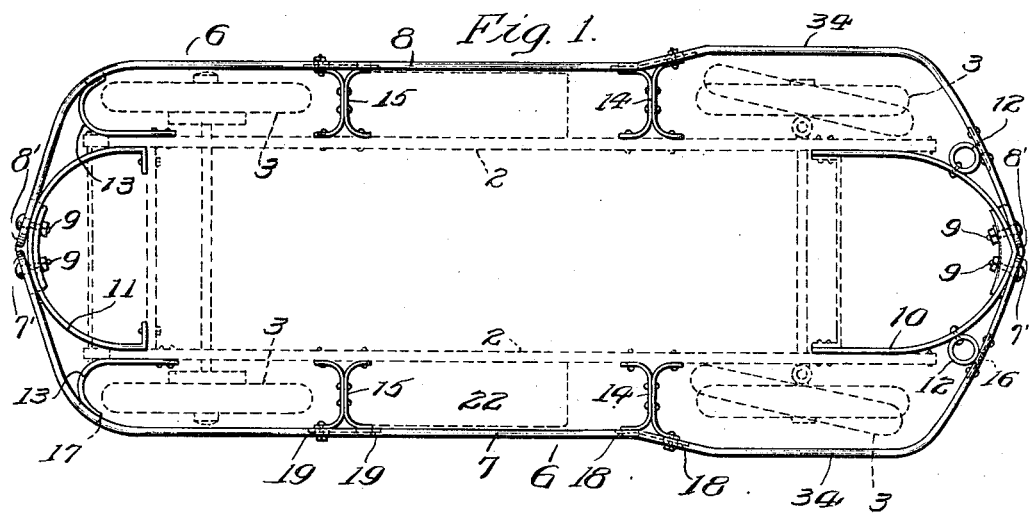
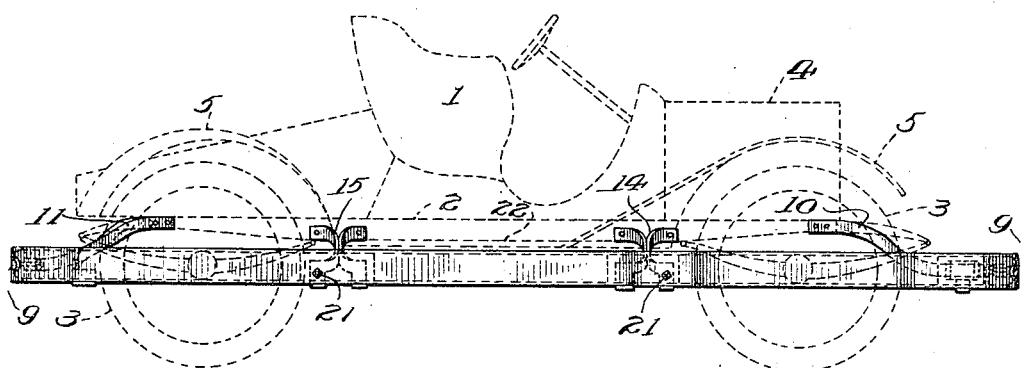
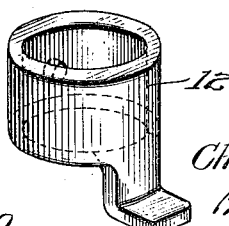
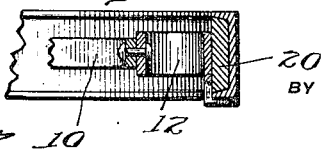
WITNESSES
INVENTOR
Charles W. M. Guhle.
BY
ATTORNEY No. 896,104.
C. W. M. GUHLE.
GUARD OR FENDER FOR VEHICLES.
APPLICATION FILED JAN. 20, 1908.
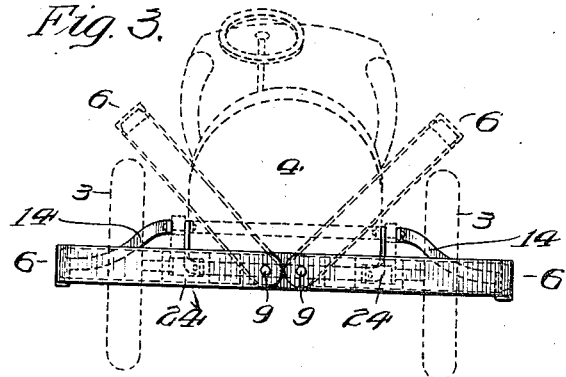
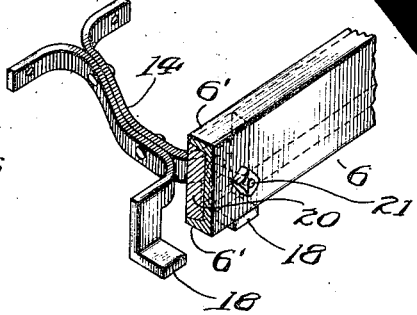
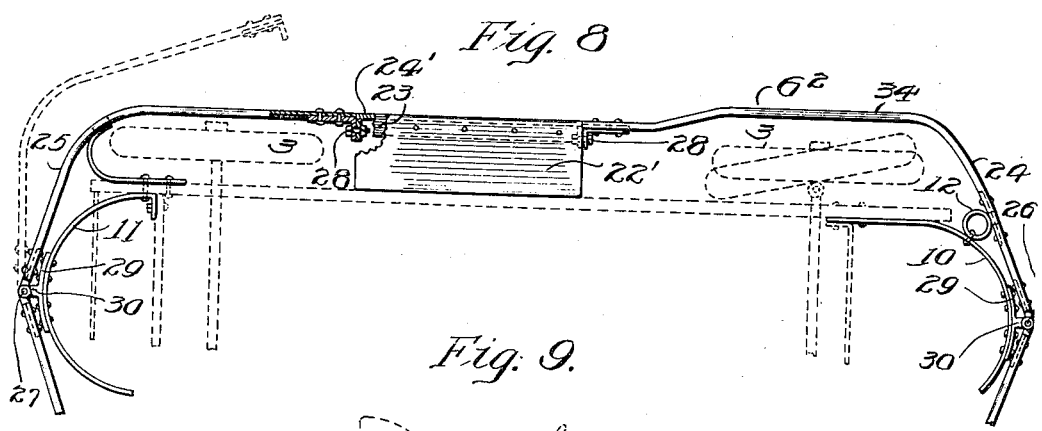
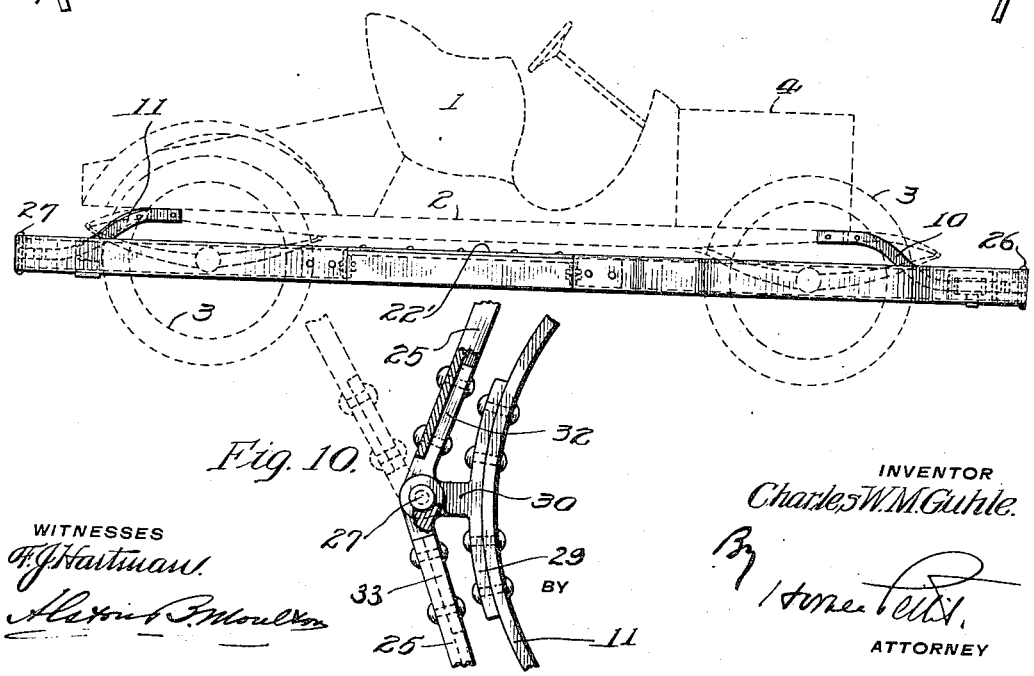
WITNESSES
F. J. Hartman
Alston P. Moulton
INVENTOR
Charles W. M. Guhle.
BY
ATTORNEY

UNITED STATES PATENT OFFICE.

CHARLES W. M. GUHLE, OF PHILADELPHIA, PENNSYLVANIA, ASSIGNOR OF ONE-THIRD TO FREDERICK J. RITTER, OF PHILADELPHIA, PENNSYLVANIA.

GUARD OR FENDER FOR VEHICLES.

No. 896,104.        Specification of Letters Patent.        Patented Aug. 18, 1908.

Application filed January 20, 1908. Serial No. 411,594.

*To all whom it may concern:*

Be it known that I, CHARLES W. M. GUHLE, a citizen of the United States, and a resident of the city of Philadelphia, State of Pennsylvania, have invented certain new and useful Improvements in Guards or Fenders for Vehicles, of which the following is a full, complete, and exact disclosure.

My invention relates to protecting guards or fenders for vehicles and particularly to such devices adapted to be used with automobiles, motor cars and the like and has for its object the preventing of injury to the vehicle, and particularly to the running gear of the same.

As is well known in the event of a collision of a motor car with another car or with any other object the effect of the collision is generally to break the wheels or spring the axles, or injure the radiator or projecting parts of the machine. My invention contemplates the substantial encircling of the running gear and the projecting parts of the vehicle with a suitably stiffened protective band or guard rail located outside of the said parts, which band is adapted to receive the shock of the collision of the vehicle with any object and protect the vehicle from injury.

It is also well known that when two vehicles collide the wheels very often become locked and the axles sprung, the steering gear is often injured and the machine rendered, for the time being, at least practically useless. My invention contemplates the providing of a substantially continuous band of suitably stiffened material all around the running gear and the projecting parts of the vehicle, so that the entire machine is protected from injury arising from such accidents.

In the drawings forming a part of this specification in which like reference characters are used throughout the various views to designate the same parts, Figure 1 is a plan view of my preferred form of my device as applied to an automobile, the outlines of the automobile being shown in dotted lines. Fig. 2 is a side elevation of the same; Fig. 3 an end elevation showing the sides of the protective band elevated or swung up clear of the running gear or wheels; Figs. 4, 5, 6, and 7 are details of the construction illustrating the manner in which the protective band is supported and attached to the vehicle; Fig. 8 is a modified form of my device in which the step of the vehicle forms a part of the protective band; Fig. 9 is an outside elevational view of the form of device illustrated in Fig. 9; Fig. 10 is a detail view of one form of hinge which may be used in connection with the modification illustrated in Figs. 8 and 9.

Referring first to the form of device illustrated in Figs. 1 to 7 inclusive the body 1 of the vehicle is provided with a running gear frame 2, the wheels 3, the radiator 4 and the wheel or mud guards 5. Completely encircling the running gear of the machine and substantially situated in alinement with the axes of the wheels 3, I provide a protective band or guard rail 6 which may be composed of two parts 7 and 8, the ends 7'—7' and 8'—8' of which are pivoted on bolts or pins 9—9 secured to suitable braces or supports 10 and 11 rigidly attached in any suitable manner to the front and rear ends respectively of the machine. Between the ends 7'—7' and 8'—8' of each part 7 and 8 of the band 6 are suitably arranged braces and supports 12, 13, 14 and 15.

In the form of my device shown in Figs. 1 to 7 of the drawings, the brace and support 12 may consist of a tubular ring as illustrated in Fig. 5, the side of which adjacent the band being provided with a step or ledge 16 upon which the bar 6 may rest when in the position shown in Fig. 2. Likewise at the other end of the band 6 and adjacent the rear of the vehicle, the brace and support 13 has a step or ledge 17 for supporting the band 6. The braces and supports 14 and 15 I have shown as composed of structural iron or steel bent at their outer ends to form a pair of steps or ledges 18—18 and 19—19 for a similar purpose. I have shown the band or guard rail 6 as constructed of a channel iron, since this form of bar or band is exceedingly stiff and adapts itself particularly well for my purposes, but I do not wish to be construed as being limited to any particular material or to any particular shape, as it is obvious that my invention is capable of embodiment in many forms. When constructed of channel irons or similar material, however, it is desirable to thicken the guard rail 6 in any suitable manner at the points where it is pivoted upon the bolts 9, and also at those points at which it rests upon the braces or supports 12, 13, 14 and 15, in order that the parts 7 and 8 of the same may turn freely upon their pivots 9, and at the same time be in contact with and capable of being fastened securely to the said braces. I have shown this thickening of the band 6 at the places above referred to, as accomplished by placing or securing between the webs 6' of the angle iron, a plate, or bar, or block 20, the thickness of which is substantially equal to the depth of the channel in the channel bars. As before stated these plates 20 are placed between the webs of the bar at the point wherever the same is supported or braced, so that when the bar is in the position shown in Fig. 2 the band will press firmly against the support or brace at that point, and at the same time will permit the band to be swung up above the wheels, when desired, without interfering with the webs of the channel iron.

Instead of using channel iron having two webs 6'—6' for the band 6 in the machine, I may make use of angle or T-shaped iron or steel, or any other form of structural material best adapted for any particular machine or condition.

I prefer to fasten the parts 7 and 8 of the band 6 in their lowermost position firmly to the braces and supports 14 and 15 by passing a pin or a bolt 21 through the support and the bar. When the said bolts or pins 21 are removed, either part 7 and 8 of the bar 6 may be swung upwardly to the position illustrated for Fig. 3, to permit of ready access to the wheels and running gear of the machine.

With the step 22 of the vehicle slightly above the upper edge of the band 6, my protective band or guard will in no wise interfere with the entering or alighting from the vehicle.

In the form of my device illustrated in Figs. 8, 9 and 10 I may employ the step 22' as a part of the protective band, in which event I preferably provide the step on its front edge with an angle iron 23 having a depending flange 24, the depth of the flange being substantially equal to the width of the band 6², this angle iron 23 being in fact a part of the protective band 6². In order to permit of the swinging of the protective band away from the wheels of the vehicle, I preferably mount the forward and rear portions 24 and 25 of the band 6² on the vertical pivot bolts 26 and 27, so that the said ends may be swung outwardly from the vehicle in the manner indicated in Fig. 8, by merely removing the bolts 28 from the ends of the portions 24 or 25 of the band 6² from the angle bar 23 of the step 22'.

In Figs. 8, 9 and 10 I have illustrated a form of hinge or pivot which may be used with this form of my device, although the details of this construction may be varied considerably without departing from the spirit and scope of my invention. In the said figures upon the forward and rear braces 10 and 11, I secure plates 29, each having an outwardly extending lug 30, and upon opposite sides of this lug I secure, by means of the pintle or bolts 26—27, suitable knuckles 32 and 33 secured to the adjacent ends of the parts of the band 6².

The band or guard 6 may be given any desired shape but preferably I bend it outwardly around the forward wheels of the vehicle as at 34 in order that the wheels may be turned without contacting with the same, and I prefer to make both the front and rear ends or either of them pointed or wedge-shaped so that it may be possible for the machine, when it collides with an object, to strike, as it were, a glancing blow and reduce the liability of injury to the machine.

With the guard or fender of the character above described, it will be apparent that it would be impossible for any vehicles coming together to lock their wheels one with the other and the liability of injury to the wheels, the axles, steering gear or protecting parts of the vehicle is greatly reduced.

Many changes may be made in my guard or fender to adapt it for use with different makes of vehicles without departing from the spirit and scope of my invention, so long as they fall within the scope of the appended claims.

Having thus fully described my invention, what I claim and desire to protect by Letters Patent of the United States is:

1. The combination with the running gear of a vehicle, of protective means extending outside of said running gear, parts of said means being pivoted to said vehicle to permit the same to be swung clear above the running gear.

2. The combination with a vehicle, of a protective band of substantially channel shape in cross section extending around and outside of the running gear of said vehicle.

3. The combination with a running gear of a vehicle, of a substantially continuous band extending around said running gear and outside of the wheels thereof, and means to permit the parts of said band adjacent the wheels to be swung clear above the wheels.

4. The combination with the running gear of a vehicle, of a braced and stiffened protective band entirely encircling the running gear of the wheels thereof, said band being located substantially in the plane of the axes of said vehicle, and means to permit a section of said band to swing clear above one of the said wheels.

5. The combination with a vehicle, of a substantially continuous protective band extending around and outside of the wheels of said vehicle, said band being hinged to divide the same into substantially two parts upon opposite sides of the vehicle respectively to permit either part of said band to be swung clear of the wheels.

6. The combination with a vehicle, of a substantially continuous protective band having stiffening webs and extending around and outside of the wheels of said vehicle, said band being pivotally connected to the said vehicle to permit a part of said band to be swung clear of the wheels upon an axis extending substantially longitudinally of the vehicle.

7. The combination with a vehicle, of a substantially continuous protective band, of channel shape in cross section extending around and outside of the wheels of said vehicle, said band being formed in two parts, each part being pivoted to the vehicle to permit the same to be swung clear of the wheels.

8. The combination with a vehicle, of protective means extending outside of the wheels of said vehicle, said means being formed in parts, the parts adjacent the wheels being pivoted to said vehicle substantially midway between the sides thereof, and means to brace and stiffen said band and to secure the same to said vehicle.

9. The combination with a vehicle, of protective means extending outside of the wheels of said vehicle, said means being pivoted at the forward and rear ends of said vehicle upon an axis extending substantially longitudinally of the vehicle, and means between said pivots and attached to said vehicle to support said band.

10. The combination with a vehicle, of a protective band extending outside of the wheels of said vehicle, said band being pivoted at the forward and rear ends of the vehicle upon an axis extending longitudinally thereof, and means between said pivots and attached to said vehicle to support and brace said band.

11. The combination with a vehicle, of supports extending forwardly and rearwardly from said vehicle and attached thereto, a protective band composed of two parts hinged to said supports, and means to hold said parts substantially in alinement with the axes of said wheels.

12. The combination with a vehicle, of supports extending forwardly and rearwardly from said vehicle and attached thereto, a protective band composed of two parts hinged to said supports, means to hold said parts substantially in alinement with the axes of said wheels, and means to fasten said band to said supports.

13. The combination with a vehicle, and a protective band extending around said vehicle and outside of the wheels thereof, said band being pivoted at the front and rear of said vehicle to permit the parts of said band adjacent the wheels to be swung clear of said wheels.

14. The combination with a vehicle, of a protective band hinged to the front and rear of said vehicle and extending substantially all around the same, of means to support said band in substantial alinement with the axes of the wheels of the vehicle, and means to fasten said band to said support.

15. The combination with a vehicle, of a protective band having an inwardly extending web, a lateral brace for said band being made substantially as thick as the depth of said web at the point adjacent said brace.

16. The combination with a vehicle, of a substantially continuous protective band extending around and outside the wheels of said vehicle, said band being formed in parts, the parts adjacent the wheels being pivoted to said vehicle substantially midway between the sides thereof, and means to stiffen and brace said band and to secure the same to said vehicle.

17. The combination with a vehicle, of a protective band extending outside of the wheels of said vehicle, said band being mounted on pivots at the forward and rear ends of said vehicle substantially midway between the sides thereof, and means between said pivots and attached to said vehicle to support said band.

18. The combination with a vehicle, of a protective band extending around and outside of the running gear of said vehicle, said band being provided with a flange extending at an angle to the body portion of said band.

19. The combination with a vehicle, of protective means extending outside of a wheel of said vehicle and below the upper edge of said wheel, said means being mounted upon said vehicle to be swung above the upper edge of the wheel to permit of the withdrawal of the wheel.

20. In a vehicle, the combination with running gear and a body, of protective means extending outside of and below the upper edge of one of the wheels of the vehicle, and hinged to said body to be swung up above the upper edge of said wheel.

21. In a vehicle, the combination with running gear and a body, of protective means extending outside of and below the upper edge of one of the wheels of the vehicle, and hinged to said body intermediate the sides thereof, to be swung up above the upper edge of said wheel.

22. The combination with a vehicle, of protective means extending outside of a wheel thereof and mounted upon said vehicle to swing upon an axis extending substantially longitudinal of said vehicle.

23. The combination with a vehicle, of protective means extending outside of a wheel thereof and pivoted to said vehicle, intermediate the sides thereof.

In witness whereof, I have hereunto set my hand this 17th day of January, A. D. 1908.

CHARLES W. M. GUHLE.

Witnesses:
ALSTON B MOULTON,
ALEXANDER PARK.